United States Patent [19]

Iiyama et al.

[11] 4,333,429
[45] Jun. 8, 1982

[54] INTERNAL COMBUSTION ENGINE

[75] Inventors: Masahiko Iiyama, Tokyo; Tsugio Sanka, Wako; Kenji Naito, Kamifukuoka, all of Japan

[73] Assignee: Honda Giken Kogyo Kabushiki Kaisha, Tokyo, Japan

[21] Appl. No.: 208,840

[22] Filed: Nov. 20, 1980

Related U.S. Application Data

[62] Division of Ser. No. 48,468, Jun. 14, 1979, abandoned.

[30] Foreign Application Priority Data

Jun. 15, 1978 [JP] Japan .................................. 53-72421
Jun. 15, 1978 [JP] Japan .................................. 53-72422
Jun. 15, 1978 [JP] Japan .................................. 53-72424

[51] Int. Cl.³ ............................................. F02B 19/10
[52] U.S. Cl. ...................................... 123/274; 123/336; 123/442; 123/584; 137/607; 251/305; 261/23 B; 261/DIG. 50
[58] Field of Search .......... 261/23 B, 23 A, DIG. 50; 123/274, 336, 442, 584; 137/607, 597; 251/305

[56] References Cited

U.S. PATENT DOCUMENTS

| | | | |
|---|---|---|---|
| 2,095,263 | 10/1937 | Moss | 251/305 |
| 2,638,330 | 5/1953 | Morgenroth | 261/41 C |
| 3,013,778 | 12/1961 | Carlson et al. | 261/41 C |
| 3,205,879 | 9/1965 | Von Seggern et al. | 261/23B |
| 3,364,911 | 1/1968 | Baudry et al. | 261/23 B |
| 3,442,488 | 5/1969 | Adams | 251/305 |
| 3,570,821 | 3/1971 | Walker | 261/23 A |
| 3,842,810 | 10/1974 | Yagi et al. | 261/23 B |
| 3,897,524 | 7/1975 | Freismuth et al. | 261/23 A |

FOREIGN PATENT DOCUMENTS 2332767 1/1974 Fed. Rep. of Germany .... 261/23 B
1439445 6/1976 United Kingdom .............. 261/23 B Primary Examiner—Tim R. Miles
Attorney, Agent, or Firm—Armstrong, Nikaido, Marmelstein & Kubovcik

[57] ABSTRACT

A carburetor for a multi-cylinder internal combustion engine which has for each cylinder a main combustion chamber defined above the piston in the cylinder and a sub-combustion chamber defined above the main combustion chamber and communicating with the latter through a torch nozzle. The carburetor has a main intake passage and a sub-intake passage for supplying a comparatively lean mixture and a comparatively rich mixture to the main and sub-combustion chambers respectively. The carburetor has a single throttle valve shaft extending across the main and sub-intake passages with a main throttle valve and a sub-throttle valve mounted on the valve shaft and disposed in the main and sub-intake passages respectively.

The main and sub-throttle valves are attached to the single throttle valve shaft at the same attaching angle and have respective parallel surfaces and outer peripheral edge surface. The angle formed between the outer peripheral edge surface and the parallel surfaces of the main throttle valve and the angle formed between the outer peripheral edge surface and the parallel surfaces of the sub-throttle valve are different from one another so that the ratio of the open areas of the main and sub-intake passages is not constant as the throttle shaft is operated. Thereby, the ratio of weight of air introduced into the sub-combustion chamber to the weight of air introduced into the main combustion chamber can be controlled in accordance with the load condition of the engine.

7 Claims, 9 Drawing Figures

INTERNAL COMBUSTION ENGINE

CROSS-RELATED APPLICATION

This application is a division of copending application Ser. No. 48,468 filed June 14, 1979, now abandoned.

FIELD OF THE INVENTION

The present invention relates to an improvement in carburetors for use in internal combustion engines which make use of relatively lean and relatively rich mixtures.

More particularly, the invention is concerned with a carburetor for use in engines of the kind stated above, the carburetor having a main intake passage for supplying the relatively lean mixture (referred to simply as "lean", hereinafter) to a main combustion chamber, and a sub-intake passage for introducing the relatively rich mixture (referred to simply as "rich", hereinafter) to a sub-combustion chamber which is in communication with the main combustion chamber through a torch nozzle, wherein a main and a sub-throttle valve in respective intake passages are arranged so as to be controlled by a common throttle valve shaft which extends across these passages, thereby to simplify the construction of the carburetor as a whole.

DESCRIPTION OF THE PRIOR ART

The present inventors have already proposed an internal combustion engine with a sub-combustion chamber, adopting a lean mixture combustion system. According to this system, it is possible to minimize the unnecessary emissions of NOx, HC, CO and so forth. The present inventors have also proposed a carburetor for use in combination with this type of engine, in U.S. Pat. No. 3,842,810 granted to Yagi et al and assigned to the same assignee as in the present invention.

A typical engine of this kind employing the lean mixture combustion system is shown at FIG. 18. In this type of engine 1, a main combustion chamber 1$b$ is formed above a piston 1$e$ within a cylinder 1$a$. Also formed in the cylinder 1$a$ is a sub-combustion chamber 1$d$ which communicates with the main combustion chamber 1$b$ through a torch nozzle 1$c$. The main and the sub-combustion chambers 1$b$, 1$d$ are adapted to be supplied with lean and rich mixtures, respectively. The lean and rich mixtures thus supplied in combination provide an air fuel ratio which is leaner than stoichiometric, and the engine operates with this lean mixture. A carburetor 2 for supplying mixtures to this type of engine, therefore, has a comparatively large main intake passage 2$a$ for forming a lean mixture to be fed to the main combustion chamber 1$b$ and a comparatively small sub-intake passage 2$c$ for forming a rich mixture to be fed to the sub-combustion chamber 1$d$. The illustrated carburetor is a compound carburetor having primary and secondary main intake passages 2$a$, 2$b$ which communicate with the main combustion chamber 1$b$ through a main intake pipe 3$a$, while the sub-intake passage 2$c$ is in communication with the sub-combustion chamber 1$d$ through a sub-intake pipe 3$b$.

Throttle valves 4$a$, 4$b$ are disposed in downstream side portions of the main intake passages 2$a$, 2$b$, while the sub-intake passage 2$c$ has a throttle valve 4$c$ disposed in the downstream side portion thereof. A choke valve 5 is disposed in the upstream side portion of the primary main intake passage 2$a$. These valves are carried by their own shafts. The sub-intake passage 2$c$, secondary main intake passage 2$b$ and the primary main intake passage 2$a$ are disposed in the mentioned order in the longitudinal direction of the engine, such that the sub-intake passage 2$c$ is closest to the cylinder of the engine. Thus, the primary main intake passage 2$a$ and the sub-intake passage 2$c$ are spaced from each other, and the throttle valve shafts 6$a$, 6$c$ in these passages are arranged to extend in parallel with each other but are spaced from each other in the longitudinal direction of the engine.

This type of carburetor is required to adequately control the ratio of the weight of air introduced into the main and sub-combustion chambers, the ratio being usually referred to as the "$\lambda$", ratio, i.e. the ratio of weight of air introduced into the sub-combustion chamber to that introduced into the main combustion chamber, in response to the load condition of the engine.

The "$\lambda$" ratio can be substituted by the ratio of the opening area of the sub-intake passage to that of the main intake passage. It is, therefore, necessary that the main and sub-throttle valves 4$a$, 4$c$ be suitably controlled to optimize the air-fuel ratio of the mixtures fed to both combustion chambers over all load condition of the engine.

To this end, the main and sub-throttle valves 4$a$, 4$c$ are connected to each other by a suitable linkage mechanism or a cam mechanism and are operated simultaneously to control the ratio of the opening areas of both intake passages, in response to the load condition of the engine, to effect a control of the "$\lambda$" ratio.

This conventional carburetor has the disadvantage of requiring a linkage or cam mechanism for actuating the shafts of the main and auxiliary throttle valves, as well as the troublesome setting of a lever ratio or cam profile.

Thus, the conventional carburetor of the type described requires an impractically large number of parts which can be produced only through troublesome and complicated work. The construction of the carburetor, therefore, is complicated, which makes the fabrication and assembly difficult, resulting in increased cost of production of the carburetor.

In addition, since the main and sub-intake passages are spaced from each other, it is necessary to use independent shafts to support the main and the sub-throttle valves. This also makes the length of the carburetor impractically large in the longitudinal direction of the engine. Due to the increased size and due to the increased number of parts, the total weight of the carburetor, as a whole, is increased correspondingly.

Particularly, in this type of carburetor, at least two shafts are required to carry at least one main throttle valve and the sub-throttle valve. Since these shafts are operatively connected to each other through a linkage or cam mechanism, the fabrication and assembly are extremely complicated and difficult. Further, this type of carburetor is not suitable for mass production, because a high precision is required in the fabrication and assembly of the linkage or cam mechanism, as well as working precision in the production of the throttle valves.

Further, there is a tendency for dimensional errors of the parts of the linkage mechanism or cam mechanism to accumulate to produce an unacceptably large error which can be corrected only through a troublesome readjustment, which makes the fabrication and assembly even more difficult. Since this type of carburetor employs a large number of movable or sliding parts, the error increases with time due to the wear of these movable or sliding parts. Thus, this type of carburetor is also not preferred from the view point of maintenance.

SUMMARY OF THE INVENTION

It is therefore a major object of the invention to obviate the above described disadvantages of the carburetor of the prior art by providing an improved carburetor.

The invention seeks to provide an improved carburetor in which the complicated controlling mechanism such as the linkage mechanism and cam mechanism is eliminated to reduce the number of parts and movable portions and afford a simple construction, reduced size and weight, high dimensional precision, high efficiency of fabrication and assembly improved durability and moderate cost.

In the carburetor illustrated in FIG. 8, the choke value is provided only in the main intake passage 2a, and the sub-intake passage 2c for forming the rich mixture has no choke valve. It is, however, desirable that the sub-intake passage for forming the rich mixture be provided with a choke valve, since the sub-intake passage 2c constitutes a part of the starting system of the engine.

The additional provision of a choke valve in the sub-intake passage in the conventional carburetor of the construction illustrated in FIG. 8, however, is extremely difficult, because the addition of such a choke valve together with associated parts and actuating mechanism further complicates the construction of the carburetor which already has a mechanism for controlling the "λ" ratio disposed between two shafts of the main and sub-throttle valves 4a, 4b which are spaced from each other, and because there is no space for accommodating the choke mechanism including the operation system thereof. The undesirable mutual interference of the operation system cannot be avoided without incurring a further complication of the construction of the carburetor. Thus, from a view point of fabrication and assembly, it is quite difficult and disadvantageous to provide an additional choke mechanism. Even if the additional provision of the choke mechanism is possible, an increase in production cost is unavoidable.

To overcome such problem in the prior art carburetor, according to the invention, a choke valve shaft carrying at least one choke valve for opening and closing one or both of the main and sub-intake passages is disposed to extend in parallel with the single shaft carrying both of the main and sub-intake valves. Preferably, the choke valve shaft carries main and sub-choke valves which are separate from each other and adapted to open and close the main and the sub-intake passages, respectively.

Alternatively, the choke valve can be formed as one body from a plate member which is carried by the choke valve shaft so as to open and close the main and sub-intake passages in common.

This arrangement permits a simple adjustment of the intake air flow rates for the main and sub-intake passages, as well as improving the starting characteristics of the engine, due to the additional provision of the choke valve for the sub-intake passage, all with a minimized number of valve shafts and hence at a reduced cost.

At the same time, since the choke valve is disposed to extend parallel with the common throttle valve shaft, the mechanisms for actuating these shafts can be disposed at one side of these shafts, so that the operation system as a whole is rationalized and simplified. This in turn facilitates the installation of other auxiliary mechanisms, such as fast idle mechanism.

When the carburetor of the type described is installed at the upstream side of an intake manifold of a multi-cylinder engine, i.e. in the case in which the carburetor is attached to an engine having 4 or 6 cylinders disposed in the direction perpendicular to the drawings, the main intake passage including the fuel discharge nozzle is not disposed along the central axis of fuel distribution in the intake manifold. In addition, as will be understood from FIG. 9 which shows a plan view of the carburetor of the type described, the fuel nozzles 11, 12, 13 of the main and sub-intake passages are not disposed to extend in parallel with the line interconnecting the centers of the intake passages, but are inclined laterally from the vertical plane including that line. Therefore, when the intake passages are disposed such that the line intersecting the centers of the intake passages forms a right angle to the line intersecting the centers of the cylinders of the engine, it is not possible to obtain a uniform distribution of fuel over all the cylinders, because the fuel nozzles are disposed obliquely, and this is so even if the conditions such as position of the carburetor, position of the intake manifold and shape of the intake manifold are changed and adjusted.

In the lean mixture combustion system, the combustion is maintained with a mixture of a theoretically threshold combustible air-fuel ratio and the operation characteristics, as well as the exhaust characteristics are greatly affected even by a slight change in the air-fuel ratio. Therefore, in this type of engine making use of a lean mixture, particularly in a multi-cylinder engine, the demand for uniform distribution of fuel to all cylinders is more severe than in other ordinary engines. Such a uniform distribution of fuel is desired for achieving an improvement in performance of the engine of the type stated above.

To this end, according to the invention, the main and sub-intake passages of the carburetor for use in the engine of above stated type are disposed parallel with each other, and the throttle valves of these intake passages are operated by a common shaft which extends parallel to the engine crank shaft. Both of the main and sub-intake passages are adapted to be supplied with fuel from a common float chamber. In addition, the main intake passage is so arranged that its axis coincides with the distribution central axis of the intake pipe of the engine to render the distribution of fuel to all cylinders uniform. Preferably, the fuel discharge port opening into the main intake passage is disposed on the central distribution axis of the intake pipe and extends parallel with the latter.

These and other objects, as well as advantageous features of the invention will become clear from the following description of the preferred embodiments taken in conjunction with the accompaying drawings.

DETAILED DESCRIPTION

Figure 1:
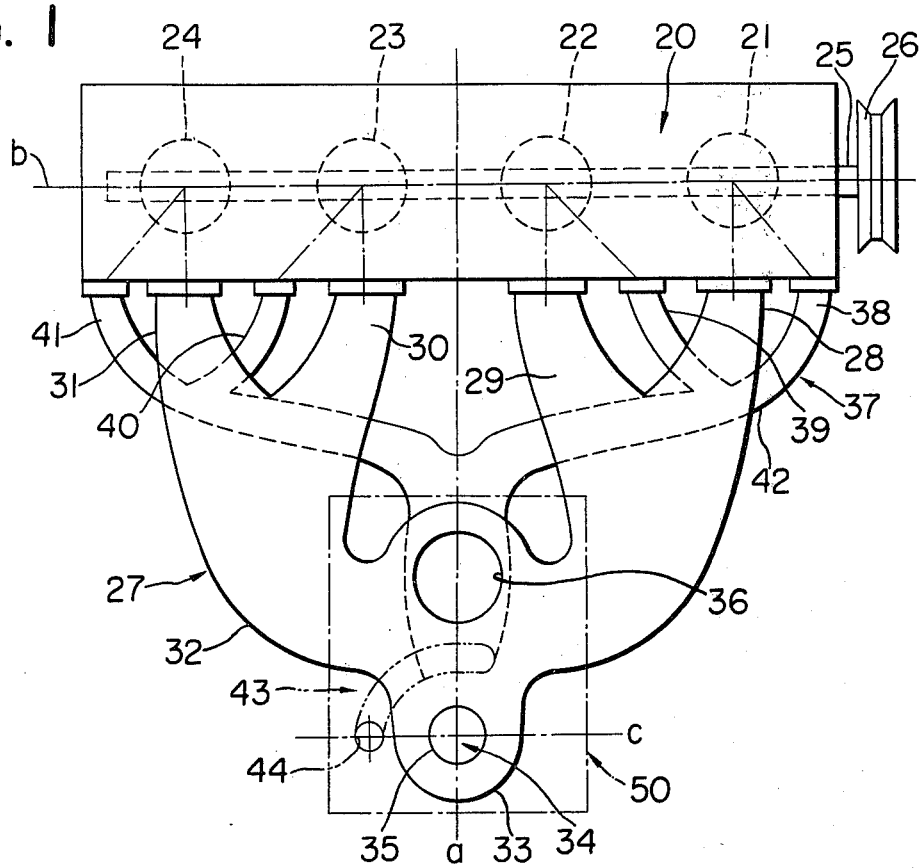
FIG. 1 is a schematic plan view of a multicylinder engine, for explaining the theory of the invention.
Figure 8:
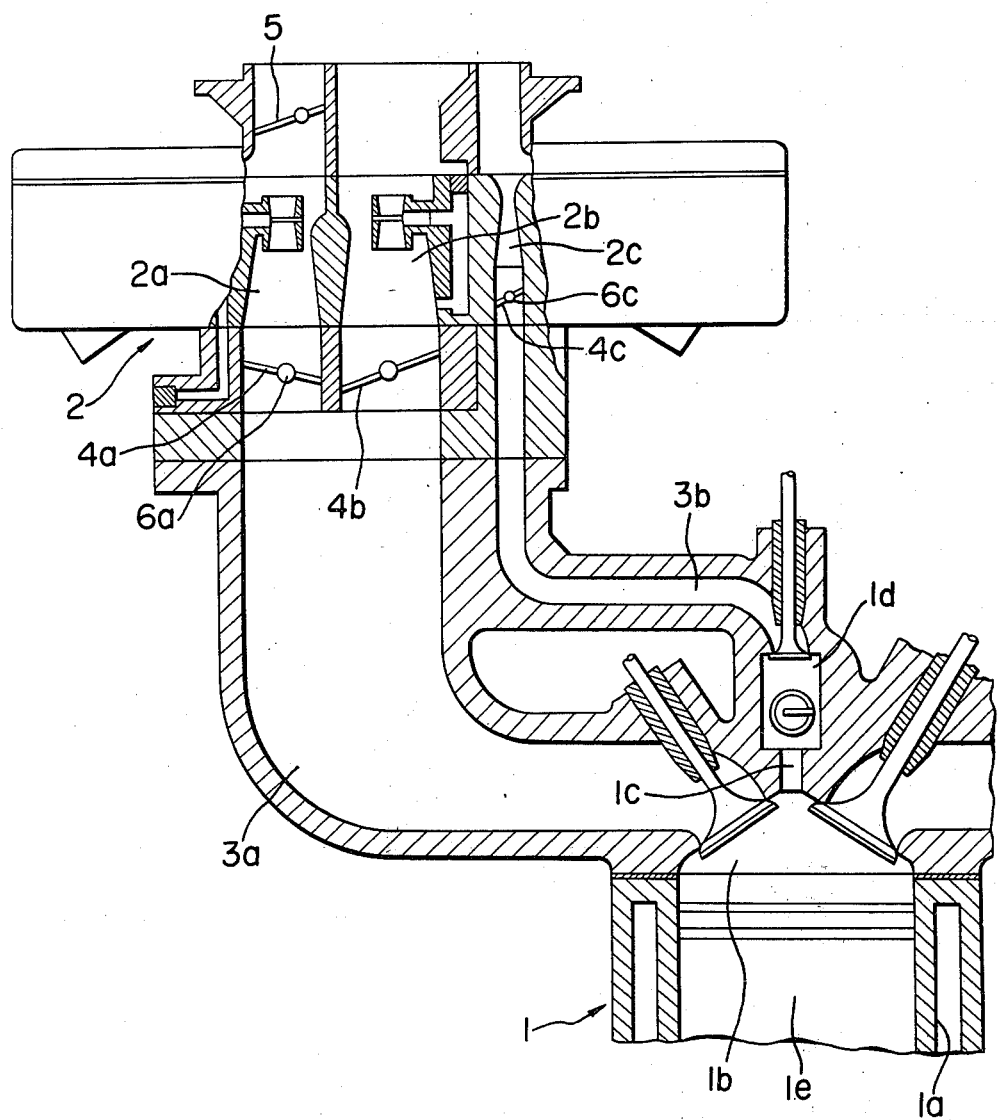
FIG. 8 is a vertical sectional view of a compound vortex flow controlled combustion type engine and a conventional carburetor for use in this type of engine.

Referring first to FIG. 1 which is a schematic plan view of a multi-cylinder engine (4 cylinders are shown in the illustrated engine), the engine comprises a cylinder block 20 having cylinders 21-24 which are disposed along a line at a constant spacing. Each of the cylinders 21-24 accommodates, as is conventional, a piston (not shown in FIG. 1 but visible at 1e in FIG. 8) above which is defined a main combustion chamber 1b. Each cylinder further has a sub-combustion chamber 1d which is formed above the main combustion chamber and which communicates with the latter through a torch nozzle 1c. Immediately below the cylinders 21-24 is a crank shaft 25 having a projected end to which is attached a pulley 26 through which auxiliary apparatus such as a compressor, water pump, dynamo and the like are driven.

A main intake manifold 27 for supplying a lean mixture to the cylinders 21-24 is disposed at one side of the block 20. The main intake manifold 27 is provided with branch pipes 28-31 leading to respective cylinders. These branch pipes 28-31 communicate with one another through a communication pipe 32 which extends parallel to the side surface of the block 20. The portion of the communication pipe 32 at which it is connected to the branch pipes 28-31 is suitably curved to reduce the flow resistance encountered by the intake flow. A merging and distribution section 33 is formed to include the central axis a of four parallel branch pipes 28-31 and to project outwardly as illustrated. The distribution section 33 has a passage which communicates with the passage in the communication pipe 32, i.e. with the branch pipes 28-31. The central axis a crosses a line b interconnecting the centers of the four cylinders 21-24. A main intake opening area 34 communicating with the main intake passage of a carburetor 50 is defined in the aforementioned distribution section 33 which is formed on the central axis a. Namely, the main intake opening area 34 is positioned on the distribution central axis a of the intake manifold 27. In the illustrated embodiment, since the carburetor 50 is of two-barrel type, two main intake openings 35, 36 are formed in the main intake opening area 34. The opening 35 further from the cylinder block and the opening 36 closer to the cylinder block 20 will be referred to hereafter as primary and secondary intake openings, respectively. These primary and secondary openings are so formed that their centers are located on the distribution central axis a.

In addition to the main intake manifold 27 for the main combustion chambers, there is provided a sub-intake manifold 37 for the sub-combustion chambers. The sub-intake manifold 37 lies under the main intake manifold 27, and has four branch pipes 38-41 extending parallel to corresponding branch pipes 27-31 of the main intake passage. These branch pipes 37-41 communicate with one another through a communication pipe 42. A merging and distribution section 43 of the sub-intake manifold 37 is placed at one side of the distribution section 33 of the main intake manifold 27, and has a sub-intake opening 44 which is placed such that the line c interconnecting its center and the center of the primary intake opening 35 of the main intake opening area 34 extends parallel to the axis of the crank shaft 25.

Figure 3:
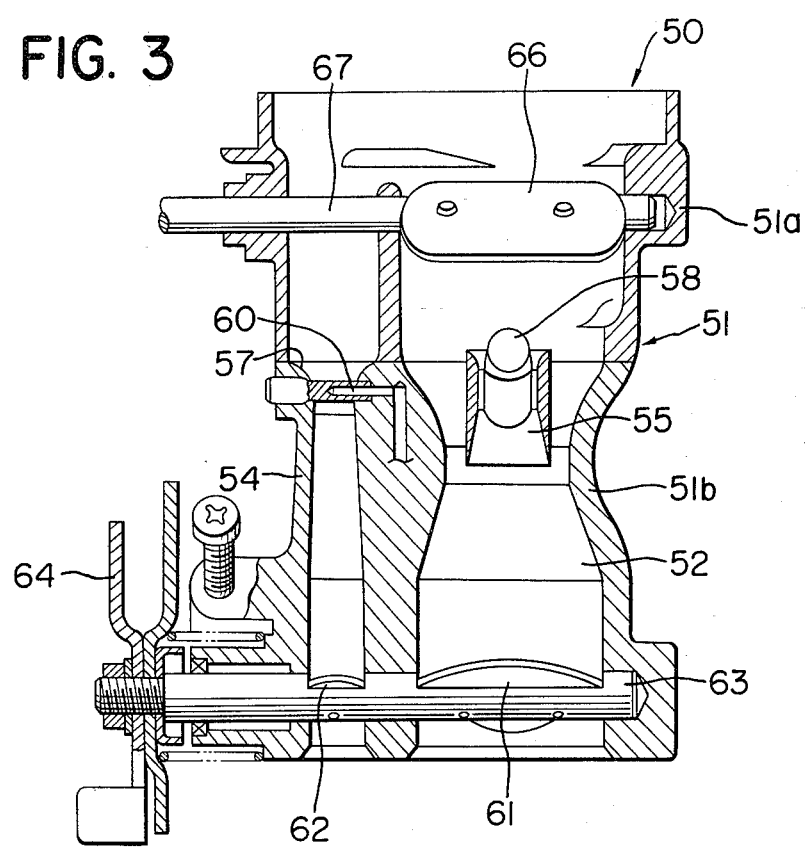
FIG. 3 is a sectional view taken along line III—III in FIG. 2.
Figure 6:
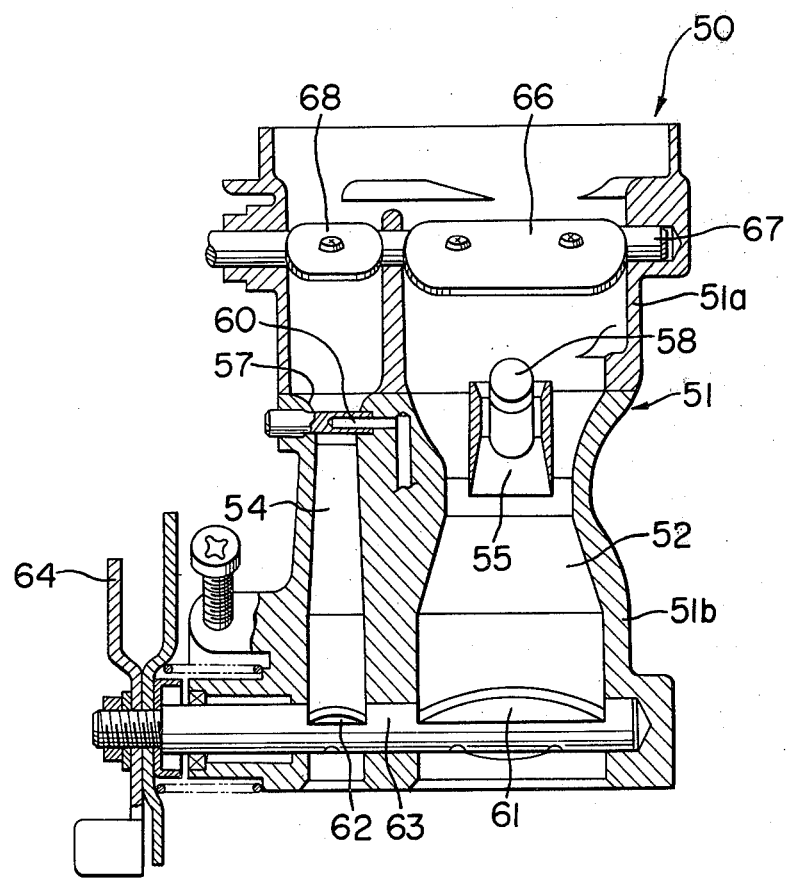
FIGS. 6 and 7 show different embodiments of the FIG. 3 device.

As shown in FIGS. 3 and 6, the carburetor 50 has upper and lower bodies 51a, 51b. The lower body 51b is provided with a primary main intake passage 52 and a secondary main intake passage 53. In addition, a sub-intake passage 54 of a diameter smaller than that of the primary and secondary passages is disposed at one side of the primary main intake passage 52.

The primary and secondary main intake passages 52, 53 are disposed in the longitudinal direction with their centers located on the aforementioned central axis a so as to correspond, respectively, to the primary and secondary intake ports 35, 36 provided in the distribution section of the main intake manifold 27. Similarly, the sub-intake passage 54 corresponds to the intake opening 44 of the sub-intake manifold 37. The intake passages 52, 53 and 54 are provided with small venturi sections 55, 56 and a venturi section 57, respectively. Fuel injection nozzles 58, 59 and 60 open at these venturi sections 55, 56, 57, respectively.

In FIG. 3, the carburetor is shown with its side closer to the cylinders positioned at the upper side of the figure. In attaching the carburetor 50 to the engine, the axis of the primary main intake passage 52 is aligned with the distribution central axis a of the main intake manifold 27 and then the center of the secondary main intake passage 53 is aligned with the same axis a. The injection ports of the nozzles 58, 59 are aligned with the axis a but face in opposite directions, i.e. at 180° from each other, so as to ensure a better distribution of the fuel. The nozzles 58, 59 and 60 are adapted to be supplied with fuel from a common float chamber 68.

In the carburetor having the described construction, the main intake passages of the carburetor are disposed on the center of the intake pipe of the engine, i.e. on the distribution central axis a of the main intake manifold, and the injection ports of the respective fuel injection ports are aligned with the axis a. Therefore, the fuel is supplied along the distribution central axis of the intake pipe, so that it is possible to render the distribution of mixture as uniform as possible to the cylinders which are located at both sides of the distribution central axis a.

It is significant that, according to the invention, the uniform distribution of mixture to all cylinders, which has been demanded by lean-mixture combustion type multi-cylinder engines having sub-combustion chambers, is achieved by only one carburetor. Thus, it becomes possible to enjoy the advantage of this type of engine, i.e. improvement of the engine performance with relatively lean total mixture, without any accompanying disadvantages.

The uniform mixture distribution is remarkable, because the main intake passages are disposed in alignment with the distribution central axis, and because the fuel injection ports in these passages are aligned with the distribution central axis. The superior uniform mixture distribution is maintained even when the vehicle makes a sudden turn.

At portions of the main and sub-intake passages 52, 54 of the main carburetor 50 downstream from the venturies 55, 57, there is disposed a throttle valve shaft 63 which extends transversely of the lower body 51b and across the main and sub-intake passages 52, 54. The axis of this throttle valve shaft 63 coincides with the line c interconnecting the centers of the primary intake opening 35 and the sub-intake opening 44. The throttle valve shaft 63 carries, at its portions exposed to the inside of the main and sub-intake passages 52, 54, main and sub-throttle valves 61, 62 fixed thereto by means of screws. The shaft 63 projects at one end from one side of the lower body 51b. A control lever 64 is attached to the projecting end of the shaft 63.

Thus, the main and sub-throttle valves 61, 62 are attached to the throttle valve shaft 63 in common so as to be moved simultaneously by the shaft 63.

In the drawings, reference numeral 67 denotes a choke valve shaft which extends parallel to the throttle valve shaft 63 above the latter. The choke valve 67 carries a choke valve 66 which opens and closes the main intake passage 52.

According to the invention, it is necessary that, with the above stated arrangement, the main and sub-combustion chambers be supplied with mixture of an air-fuel ratio which is controlled in accordance with the aforementioned "λ" ratio, i.e. the ratio of weight of air introduced into the sub-combustion chamber to the weight of air introduced into the main combustion chamber. To satisfy this requirement, the arrangement is such that the ratio of the opening areas of the main and sub-intake passages 52, 54 provided by the throttle valves 61,62 is not constant but, rather, the throttle valves 61, 62 are controlled to provide a phase differential of degree of opening of these valves to present the optimum "λ" ratio in accordance with the load condition of the engine.

It is difficult to realize a phase differential of degree of opening of both throttle valves which are carried and operated by the common throttle valve shaft. However, according to the invention, this problem is solved and the throttle valves carried by the common throttle valve shaft are controlled to provide the desired "λ" ratio, as stated hereinunder.

Figure 4:
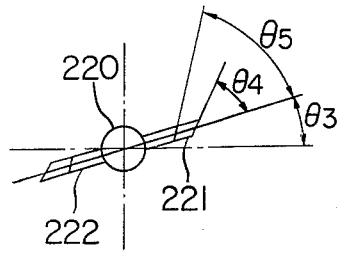
FIG. 4 is a side elevational view of the invention.

FIG. 4 shows an embodiment in which main and sub-throttle valves 221, 222 are attached to common throttle valve shaft 220 at equal angles $\theta_3$, such that the two throttle valves lie in the same plane. However, the angle $\theta_4$ at which the peripheral edge surface of the main throttle valve 221 is inclined to the parallel upper and lower surfaces of the same valve is different from the angle $\theta_5$ at which the peripheral edge surface of the sub-throttle valve 222 is inclined to the parallel upper and lower surfaces of the same valve. Thereby, the ratio of the projecting areas of the throttle valves on the cross-sectional planes of the respective intake passages to each other varies, as both throttle valves are rotated by the common throttle valve shaft (see FIG. 5.).

It is therefore possible to control the ratio of the opening areas of the main and sub-intake passages afforded by the respective throttle valves, in accordance with the desired "λ" ratio.

Figure 5:
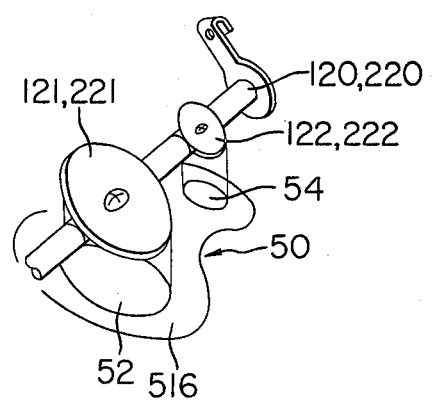
FIG. 5 is a prospective view of the invention.

FIG. 5 is a perspective view explanatory of the throttle-valve arrangement as shown in FIG. 4.

Figure 2:
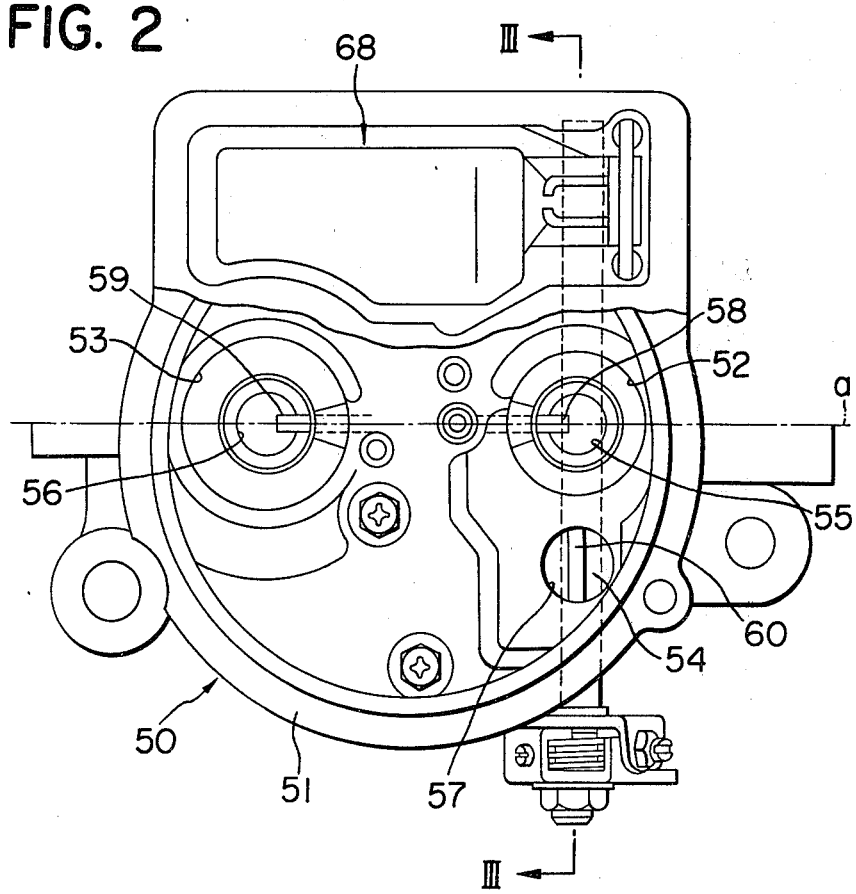
FIG. 2 is a plan view of a carburetor in accordance with the invention.

FIG. 6 shows a modification of the carburetor as shown in FIGS. 1 to 3. In this modification, a choke valve shaft 67 is disposed at the upstream side of the main and subintake passages 52, 54 of the carburetor 50 so as to extend across the upper body 51a and the intake passages 52, 54. The choke valve shaft 67 is located above the throttle valve shaft 63 and extends parallel to the latter. The choke valve shaft 67 carries main and sub-choke valves 66,68 disposed in respective intake passages 52,54 for opening and closing the intake passages. In this carburetor, the choke valves 66,68 are formed separately and are attached independently to the common choke valve shaft 67 by means of screws or the like. That end of the choke valve shaft 67 on the same side as the projecting end of the throttle valve shaft 63 also projects from the upper body 51a and is connected by levers or like means to a control system, such as a choke lever. The portions of this modification other than those described above are identical to those of the carburetor shown in FIGS. 1 to 3, and are denoted by the same reference numberals as used in FIGS. 1 to 3.

According to this arrangement, the throttle valves 61, 62 and the choke valves 66,68 are controlled by means of the two shafts 63, 67 which are spaced in the vertical direction and extend parallel to each other. Consequently, the mechanism for controlling the throttle valves for the main and sub-intake passages is significantly simplified. In addition, this arrangement permits simple installation of the sub-choke valve for the sub-intake passage and, however, a simultaneous control of the main and sub-choke valves by a common single shaft. Further, it is advantageous that the mechanism for operating the choke valve shaft can be disposed at the same side of the carburetor as the mechanism for operating the throttle valve shaft, in a compact manner without substantial difficulty.

Figure 7:
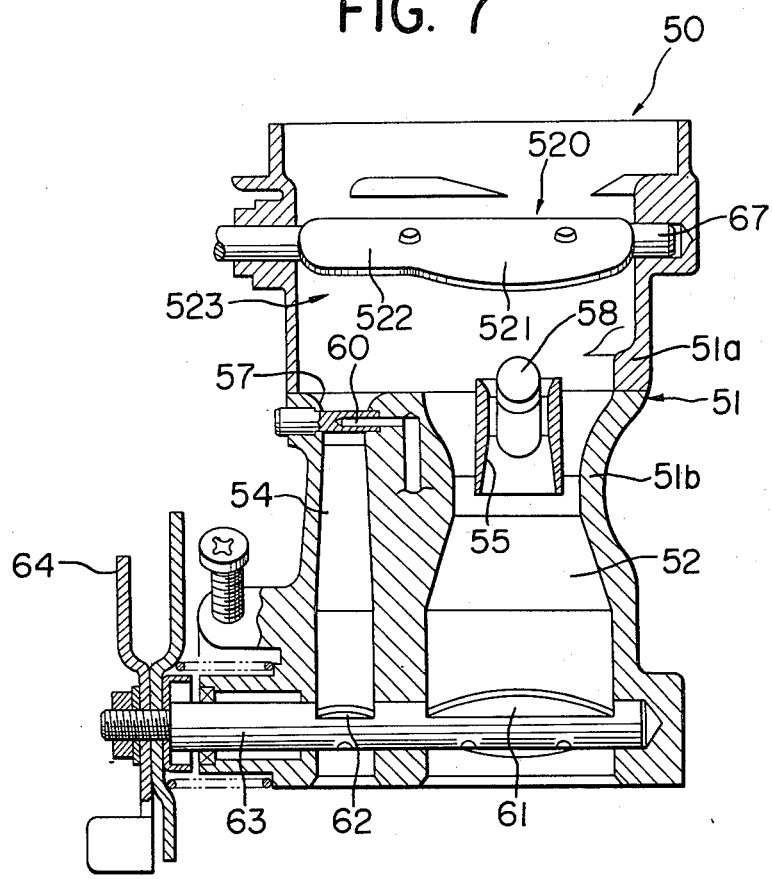
Figure 9:
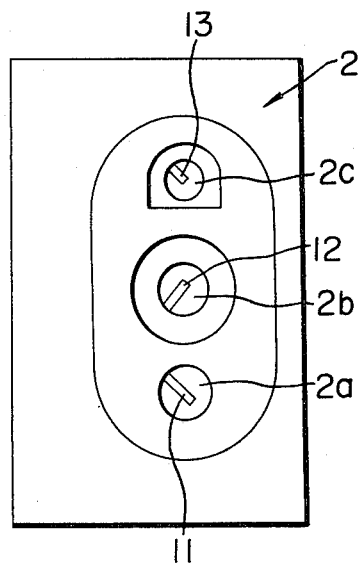
FIG. 9 is a plan view showing how the fuel injection nozzles are disposed in the carburetor as shown in FIG. 8.

FIG. 7 shows another modification of the carburetor. This modification differs from that shown in FIG. 6 only in the construction of the choke valves. The other portions are identical to those of FIG. 6 and, therefore, are denoted by the same reference numerals and are not described.

As in the case of the modification shown in FIG. 6, the choke valve shaft 67 is disposed parallel to the throttle valve shaft 63. The main and sub-intake passages 52,54 merge at their upstream ends into a common intake passage 522. The choke valve shaft 67 carries a choke valve 520 having a profile which conforms to the profile of the inner peripheral surface of the common intake passage 522. The choke valve 520 has a portion 521 having a size matching the main intake passage 52 and a smaller portion 522 having a size matching the sub-intake passage 54 which are continuously and integrally formed from a single plate member, and is fixed to the common choke valve shaft 67 by means of screws or the like.

This modification offers the advantage over the embodiment shown in FIG. 6 having a plurality of choke valve members that the number of parts is reduced since the main and sub-intake passages are opened and closed by means of a single choke valve 520.

What is claimed is:

1. In a multi-cylinder internal combustion engine having, for each cylinder provided with a reciprocal piston therein, a main combustion chamber defined above the piston and a sub-combustion chamber defined above said main combustion chamber and communicating with the latter through a torch nozzle, a main intake passage and a sub-intake passage for supplying a comparatively lean mixture and a comparatively rich mixture to said main and sub-combustion chambers, respectively, said carburetor comprising a single throttle valve shaft extending across said main and sub-intake passages, a main throttle valve and a sub-throttle valve disposed in said main and sub-intake passages, respectively, said main and sub-throttle valves being attached to said single throttle valve shaft, means attaching said main and sub-throttle valves to said single throttle valve shaft at the same attaching angles, said main throttle valve and sub-throttle valve having respective parallel surfaces and outer peripheral edge surfaces, the angle formed between the outer peripheral edge surface and the parallel surfaces of said main throttle valve and the angle formed between the outer peripheral edge surface and the parallel surfaces of said sub-throttle valves being different from one another so that the ratio of the open areas of said main and sub-intake passages is not constant as said throttle valve shaft is operated.

2. A carburetor as claimed in claim 1 comprising a choke valve shaft extending parallel to said throttle valve shaft, and at least one choke valve carried by said choke valve shaft for opening and closing at least one of said main and sub-intake passages.

3. A carburetor as claimed in claim 2 wherein said choke valve shaft carries a main choke valve and a sub-choke valve disposed to open and close said main and sub-intake passages, respectively.

4. A carburetor as claimed in claim 2 wherein said at least one choke valve is a single choke valve comprising a plate-like member for opening and closing both said main and sub-intake passages in common.

5. A carburetor as claimed in claim 2 wherein at least one choke valve is a main choke valve disposed to open and close said main intake passage.

6. A carburetor as claimed in claim 1 wherein said engine has a crank shaft coupled to the pistons and extending beneath the cylinders with said single throttle valve shaft arranged in parallel to said crank shaft; said main intake passage has primary and secondary openings having centers disposed on a central distribution axis; said main and sub-intake passages are supplied with fuel by means of a single float chamber; and said main intake passage has a center disposed on said central distribution axis of the main passage.

7. A carburetor as claimed in claim 6 comprising a fuel injection nozzle having a fuel injection port for supplying fuel to said main intake passage, said fuel injection port being disposed on said central distribution axis of said main intake passage.

* * * * *